Figure 1:
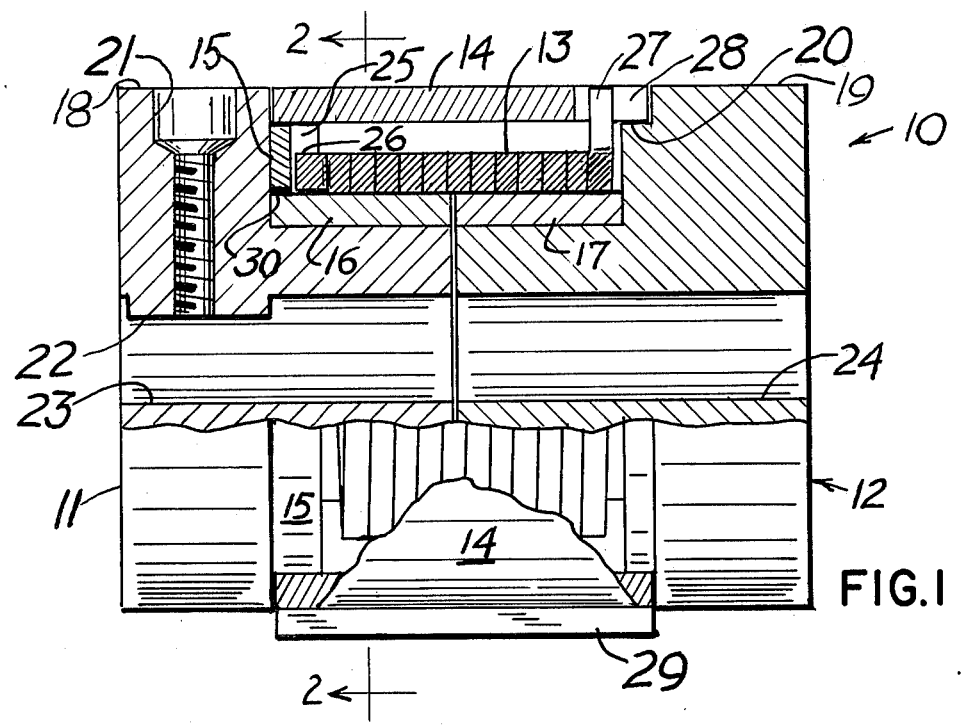

United States Patent [19]

Johnson

[11] 4,189,039

[45] Feb. 19, 1980

[54] METHOD OF INDEXING A SPRING CLUTCH

[75] Inventor: Lee W. Johnson, Lake Elmo, Minn.

[73] Assignee: Reell Precision Manufacturing Corporation, St. Paul, Minn.

[21] Appl. No.: 845,070

[22] Filed: Oct. 25, 1977

[51] Int. Cl.² .............................................. F16D 11/06
[52] U.S. Cl. ...................................... 192/26; 192/81 C
[58] Field of Search ..................... 192/41 S, 26, 33 C, 192/33 R, 81 C, 12 BA, 22

[56] References Cited

U.S. PATENT DOCUMENTS

| | | | |
|---|---|---|---|
| 2,951,568 | 9/1960 | Hungerford et al. ............ | 192/12 BA |
| 2,976,976 | 3/1961 | Parker ................................. | 192/41 S |
| 3,186,530 | 6/1965 | Petroff .............................. | 192/81 C |
| 3,373,851 | 3/1968 | Baer ..................................... | 192/26 |
| 3,521,730 | 7/1970 | Weatherby ..................... | 192/12 BA |
| 3,545,580 | 12/1970 | Baer ..................................... | 192/26 |
| 3,835,972 | 9/1974 | Helander ............................. | 192/26 |
| 3,926,286 | 12/1975 | Johnson .............................. | 192/41 S |

Primary Examiner—Benjamin Wyche
Assistant Examiner—David C. Reichard

[57] ABSTRACT

Precise angular relationship between release means and driven means is attained in a coil spring clutch by means of a spring-positioning ring which is permanently secured to the driven hub only after being rotated into desired position.

1 Claim, 3 Drawing Figures

METHOD OF INDEXING A SPRING CLUTCH

This invention relates to spring clutches wherein the clutch spring is fixed in predetermined angular relationship.

In my U.S. Pat. No. 3,926,286 I describe a spring clutch having a coil spring encircling two adjacent axially aligned hubs and enclosed within a tubular control sleeve. A radially extending end of the spring lies within a longitudinal slot in the control sleeve. The spring normally tightly grips both hubs to transfer torque from the driving to the driven hub. Stopping the rotation of the control sleeve then results in slight expansion and loosening of that portion of the spring overlying the driving hub, and torque is no longer transferred.

The internal diameter of the relaxed clutch spring of my U.S. Pat. No. 3,926,286 is sufficiently smaller than the diameter of the hub surfaces to provide the desired degree of torque. Expansion of the end coils permits slippage between the spring and the underlying driving hub; under extreme conditions some slippage may occur at the driven hub also. The resulting angular displacement of the spring with respect to the driven hub cannot be tolerated in many applications requiring clutch release at precisely determined intervals.

One way of avoiding such displacement is shown in U.S. Pat. No. 3,618,721, wherein an end tang extending axially from the clutch spring is anchored in an aperture in the hub member. The position of the spring with respect to the hub may thus be permanently fixed. However the position of the radially extended other end of the spring, and therefore of the slotted control sleeve, may not be properly situated by such expedient, due to unavoidable variations encountered in the mass production of spring and hub components.

I am aware that it has been proposed to anchor the end coil or coils of the clutch spring to the driven hub by means of an adjustable split ring or clamp encircling the coils. The clamp is tightened by means of a bolt connecting the radially extending ends of the ring. The structure is bulky and expensive, and subject to tampering.

Figure 2:
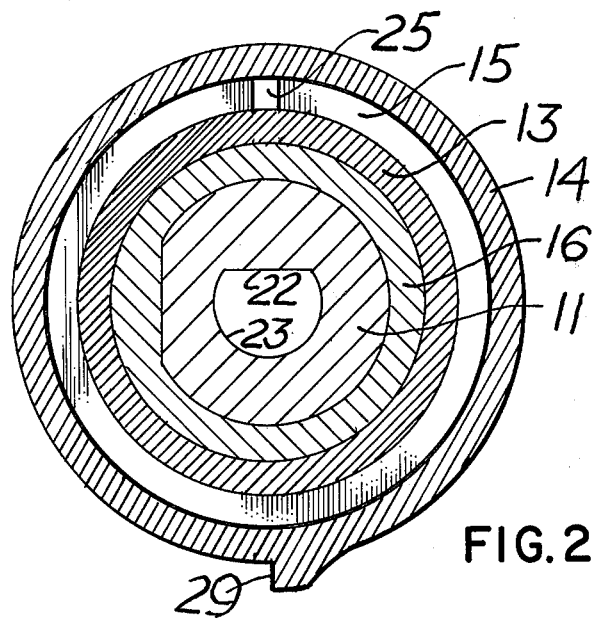
Figure 3:
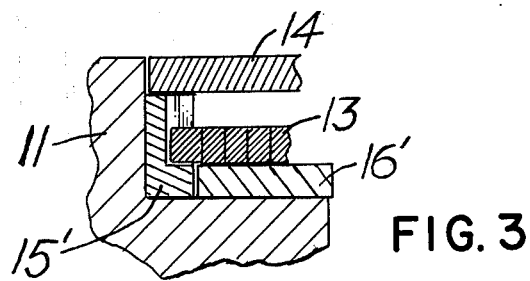

The present invention makes possible the accurate positioning of the clutch spring and control sleeve with respect to the output hub, so as to permit indexing at precisely the desired point or points in the rotation of the hub. This result is attained in a simple and convenient manner, using standarized and mass-produced components subject to the usual unavoidable dimensional tolerance variations, as will now be further described in connection with the appended drawing, wherein FIG. 1 is a side elevation, with portions cut away, and FIG. 2 is a sectional view at section 2—2 of FIG. 1, of a representative spring clutch embodying the principles of this invention, and FIG. 3 is a partial sectional view of an alternative structure.

The clutch 10 comprises an output or driven hub 11, an input or driving hub 12, a coil spring 13, a tubular control sleeve 14, and an indexing ring 15. Hubs 11 and 12 are here shown as comprising (optional) hardened sleeves 16, 17 respectively, for providing wear-resistant cylindrical contact surfaces for the spring 13. The hubs are radially extended to provide outer flange portions 18, 19, and hub 12 is further provided with a narrow central segment 20 of intermediate diameter serving as a support for the control sleeve 14. Hub 11 has a tapped bore 21 and an internal flat 22 for use in securing the hub to an aligned shaft, not shown, passing through the axial bores 23, 24 of the respective hubs and forming a component of the device to which torque is to be transmitted.

The ring 15 fitting over the sleeve 16 of hub 11 has the same external diameter as the intermediate segment 20 of hub 12 and similarly serves as a support for the sleeve 14. A narrow slot 25 in the side of the ring receives axially extended tang or end 26 of the adjacent end coil of spring 13.

A radical extension 27 of the other end of the spring 13 extends into the axial slot 28 in the control sleeve 14. The sleeve has an external indexing ridge 29 for use in preventing rotation of the sleeve and thereby releasing the clutch.

Assembly of the clutch mechanism with the indexing ridge 29 at a precisely predetermined angular relationship with the flat 22 is expeditiously accomplished as follows. The inner surface of the ring 15 is first coated with a suitable bonding agent and the ring is slid onto the sleeve 16. The spring 13 is next slid over the sleeve and placed with its extension 26 in the ring slot 25. The collar is placed over the ring and spring, with the radial extension 27 in the slot 28. The hub 12 is fitted into the open ends of spring and collar. The assembly of ring, spring, collar, and hub 12 is then carefully twisted to the desired predetermined position with the ridge 29 at the desired angular displacement from the flat 22. The bonding agent is then permitted to harden in place as binder 30; or, depending on the specific material and method used, the ring is otherwise permanently secured in place on the hub.

Although the spring fits tightly about both hub sleeves when allowed to relax thereon, it is easily slid into place on the hub sleeve and also turned to the desired angular position upon being lightly twisted in the direction causing expansion of the spring coils.

In a specific and presently preferred example the bonding agent is an acrylate-base liquid organic cement known as "Loctite" cement, available from the Loctite Corporation of Newington, Conn. and which is self-hardening when sealed between non-porous surfaces with exclusion of oxygen.

Another method of fixing the ring in the desired angular relationship is indicated in FIG. 3. The ring 15' fits directly about the hub 11, the sleeve 16' being foreshortened for the purpose. The sleeve is forced onto the hub just short of the ring, as shown, and the ring is rotated into position as previously described. The sleeve is then forced against the ring, which is thus firmly held between the sleeve and the flange 18 against subsequent rotation. No adhesive is required.

Bonding may alternatively be accomplished, although with somewhat less facility, by hot soldering or by heat shrink methods.

Using the methods described, it has been found possible consistently to attain an accuracy of within one or two degrees of arc in the angular displacement between the flat 22 and the ridge 29, in the assembling of these spring clutches from commercially mass-produced components.

What is claimed is as follows:

1. The method of obtaining desired permanent alignment between driven hub and control sleeve of a spring clutch mechanism, said mechanism comprising a coil spring tightly enclosing axially aligned adjacent driving and driven hubs and loosely enclosed within a tubular control sleeve, said driven hub including an outer sleeve providing a cylindrical contact surface for said spring, said driven hub being radially extended to provide an outer flange, said mechanism further comprising a radially slotted ring encircling said driven hub between said flange and said sleeve and extending radially beyond said sleeve adjacent the end turn of said spring and providing a support for said control sleeve, said end turn having an axial extension fitting into the slot in said ring; said method comprising assembling together at least said driven hub, ring, sleeve and spring with said sleeve partially forced into place on said hub, rotating said ring and spring into desired alignment relationship with said hub, and then completing the force fit to provide permanent securing of said ring.

* * * * *